Feb. 24, 1942. F. W. ILSEMAN 2,274,144
ELECTRICAL CONNECTOR FOR ARTICULATED TRUCKS
Filed April 18, 1941
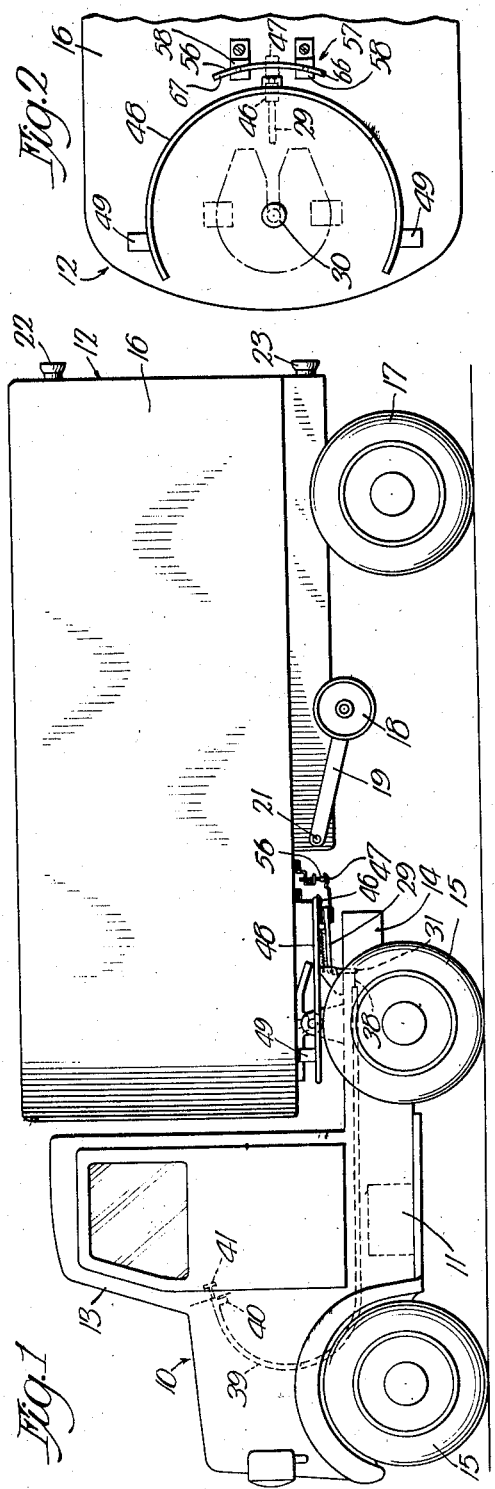
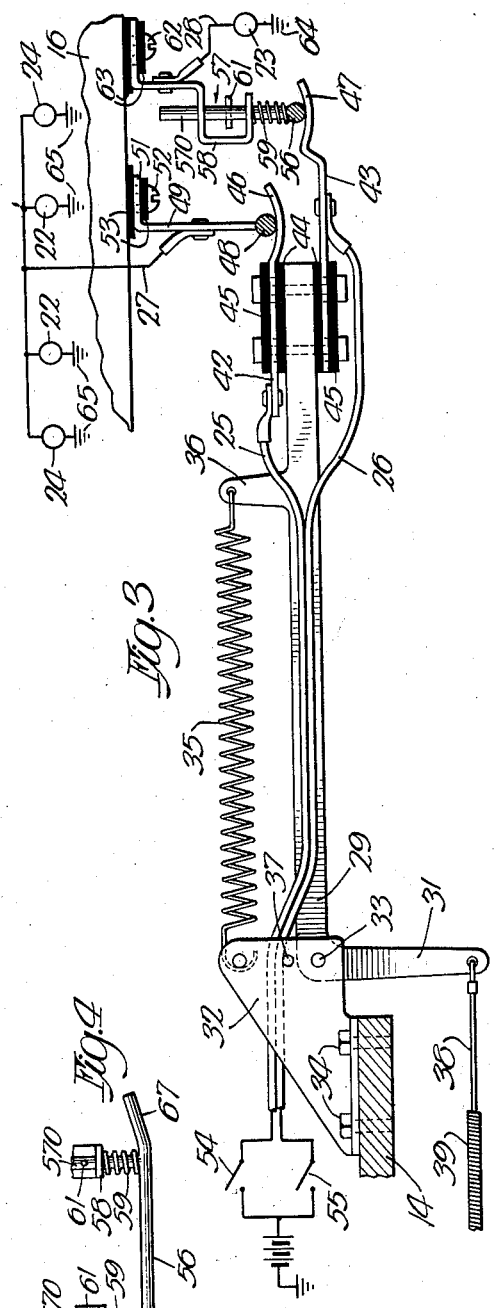
INVENTOR.
Frederick W. Ilseman
BY
ATTORNEYS.

Patented Feb. 24, 1942

2,274,144

UNITED STATES PATENT OFFICE 2,274,144

ELECTRICAL CONNECTOR FOR ARTICULATED TRUCKS

Frederick W. Ilseman, Aurora, Ill.

Application April 18, 1941, Serial No. 389,105

5 Claims. (Cl. 173—324)

This invention relates to electric connections, and more particularly to electric connections between traffic or signal lights mounted on truck trailers and the batteries on the power-supporting or tractor portion of a conventional type of commercial articulated or trailer truck.

The principal object of the invention is the provision of new and improved mechanism for connecting electric connectors leading from a battery on the tractor section of an articulated truck, with conductors for the traffic lights carried on the trailer section of the truck.

Another object of the invention is the provision of mechanism for automatically disconnecting the conductors leading from the battery on the power section of the truck, with the traffic or signal lights on the trailer section of an articulated or trailer truck.

A further object of the invention is the provision of a new and improved electric connector between the two sections of an articulated or trailer truck that is simple in construction, inexpensive to manufacture, easy to install, and efficient in operation.

Other and further objects and advantages of the invention will appear from the following description taken in connection with the accompanying drawing, in which Fig. 1 is a side elevation of the truck;

Fig. 2 is a bottom plan view of the front portion of the trailer;

Fig. 3 is a diagrammatic view of the electrical connections and portions of the operating mechanism; and Fig. 4 is a front view of one of the contact members.

In the conventional articulated or trailer truck the trailer section is detachably connected to the front or tractor section of the truck. The conventional commercial trucks are all, or substantially all, equipped for night driving. In fact, due to congestion on the highways during the daytime much of the truck traffic is carried on at night. As a rule all trailer sections of the articulated or trailer truck are provided with the required traffic lights, such as tail, side, and stop lights.

As an invariable rule the batteries are carried by the tractor portion of the truck. Connectors are provided between the leads from the battery and the conductors for the traffic lights. These connectors on the conventional truck require the presence of an operator for manually manipulating the connectors for connecting and disconnecting them. Usually the connectors are of the socket or telescopic type, which must be individually connected and disconnected by hand. At least two independent circuits are required for tail and stop lights. Only two circuits will be described, although the principle will remain unchanged even though other circuits, as for direction indicator signals or the like, be employed. One of these circuits energizes traffic lights, as the side and tail lights which are in parallel, and the other energizes the stop light. Both circuits are grounded on the frame of the vehicle, as will presently appear.

The present invention provides connector mechanism for connecting and disconnecting the electric connectors without requiring the same to be touched by hand.

Referring now to the drawing, the reference character 10 designates an articulated or trailer truck having a front trailer or tractor section 11, and a trailer or rear section 12. The front section comprises a cab or body portion 13, mounted on a frame 14 which is adapted to be supported by the wheels 15, as is usual in such constructions. The trailer portion or section 12 comprises the body 16 for containing the lading for transportation. This section is adapted to be supported at its rear end by the wheels 17, and at its forward end by the frame 14 of the tractor section of the truck, in the usual manner. Temporary supporting wheels 18, carried by links or arms 19 and pivoted, as at 21, to the frame of the trailer, are provided for temporarily supporting the forward end of the trailer when it is not attached to the truck. They are adapted to be folded out of the way when not in use, as shown in Fig. 1.

The trailer section 12 is provided with the usual signal or traffic lights, as the tail lights 22, and the stop lights 23. Side lights 24 may also be provided, if desired.

In order to energize the traffic lights suitable leads or conductors 25, 26, leading from the battery 11, are provided. Suitable means are provided for detachably connecting the conductors 25 and 26, carried by the front section, to the conductors 27 and 28, that lead to the traffic lights and which are carried by the rear or trailer section of the truck. The means for connecting the two sets of conductors constitute the subject-matter of the present invention. The leads, battery, conductors and connectors are shown diagrammatically in Fig. 3.

The connector member carried by the tractor section of the truck comprises a rigid arm or bar 29 which supports the forward portions of the electric connectors. This bar has a downwardly extended arm, as at 31, at its forward end, and is pivoted to a bracket 32, as at 33. This bracket is rigidly connected to the frame 14 of the front or tractor section of the truck, as by means of the bolts 34. The bar 39 is biased upwardly by a spring 35, which is attached at one end to an upwardly extending projection 36 rigidly attached to the bar 29, and at its opposite end to the upper end of the bracket 32. A pin or projection 37, carried by the bracket 32 above the bar 29, limits the bar's upward movement. Suitable means are provided for manually lowering the bar for assisting in making the connection when the connectors 25 and 26 are to be electrically connected to the connectors 27 and 28, respectively, as will presently appear.

This mechanism comprises a chord or cable 38, attached to the lower end of the downwardly extending arm 31, and extends to convenient position on the dash. In practice the chord or cable 38 may be a Bowden or flexible wire, having its flexible sheath 39 attached to the dash with a handle 41 on the upper end of the wire which may be pulled by the driver of the car when he wishes to lower the bar 29. A spring-pressed detent 40, engaging recesses in the handle, holds the latter in adjusted position.

Attached to the rear end of the arm 29, and supported thereby, are connector or terminal members 42, 43, which are insulated from said arm by suitable insulation 44, 45. The connectors or terminals 42, 43, terminate at their rear ends in concave extensions 46, 47, respectively. The extension 46 is adapted to engage a contact or terminal member 48, which is attached to the forward end of the frame of the body 16 beneath the same, as shown in Fig. 3. The contact member 48 is curved and is supported from the bottom portion of the trailer body 16 by bracket arms 49, each of which has an extension, as at 51 (Fig. 3), which is adapted to be rigidly secured to the frame of the body 16, as by means of the screws 52. The extension 51 is insulated from the body in any suitable manner, as by means of the insulation 53. One of the bracket arms 49 has electrically connected thereto a conductor 27 which runs to the traffic lights 22 and 24, as diagrammatically shown in Fig. 3. The traffic lights are in parallel, as shown in said figure.

A suitable manually operated switch 54, accessible to the driver, is provided for closing the circuit through the traffic lights. Suitable means are also provided for closing an electric circuit through the stop light when the brakes are applied. The brake switch is shown diagrammatically at 55 in Fig. 3. Since this connection is of usual or any well known construction, it is not thought necessary to illustrate or describe the same more in detail.

The bar 29 is provided at its rear end with a terminal 43 to which the conductor 26 is connected. The terminal 43 has a contact portion 47 which extends rearwardly of the bar and is adapted to engage a contact 56 of the terminal device 57. The terminal device 57 comprises the curved contact member 56, having the supporting arms 570 thereon which extend upwardly through suitable brackets 58 and slidably engage the same.

It is evident that unless suitable means be provided for preventing the disengagement of one or the other of the connectors 46 or 47 the movement of the truck over uneven surfaces will cause one or the other of these connectors to become disengaged. In order to prevent disengagement of either of these connectors the spring 59 is employed. The spring 35 will hold the terminal 46 in contact with conductor 48, and the spring 59 will hold the terminal 47 against the conductor 56 at all times.

The spring 59 biases the contact 56 downwardly, and a pin 61, extending through each arm 570, limits its downward movement. The brackets 58 are rigidly connected to the frame of the body of the trailer 16, as by means of the screw 62, and are insulated therefrom, as by means of the insulation 63. A conductor 28, for the stop light 23, is in electrical connection with the insulated bracket 58, as by being rigidly connected thereto, and the stop light 23 is grounded, as at 64, so that when the brakes are applied and the switch 55 is closed the stop light will be energized, due to closing the circuit through the contacts 56 and 47. The traffic lights 22 and 24 are also each grounded on the frame, as indicated at 65.

The connector 43 is a segment of a circle about the pivot or axis 30 as a center, so that the contact member 46 will continue to engage the same and make electrical connection even though the tractor or front portion of the truck is at an angle to the rear portion. In this manner the traffic lights will continue to be energized, even though the forward portion of the truck be turned to its limit of movement in either direction.

In making turns a stop or signal light is required, usually by law, to be energized before the driver begins to turn so as to warn following vehicles of the intention of the driver. In the present instance the stop light is employed for this purpose, and is energized by applying the brakes to check the velocity of the truck before making the turn. Direction indicators controlled by a switch may also be used, if desired. After the vehicle has turned through an angle of ten or fifteen degrees, it is not necessary that the direction or stop signal be continued to be energized, and for this reason the contact member 56 on the trailer is foreshortened. This contact member is also a segment of a circle about the pivot 30, so that it will be engaged by the contact member 47 during turning of the vehicle. The ends of the contact member 56 are bent upwardly, as at 66, 67, so that should the vehicle turn to such an extent that the contact members 56 and 47 become disengaged they will properly engage again when the vehicle is turned to straight ahead position.

When it is desired to separate the trailer from the tractor portion of the truck, the wheels 18 are lowered and the draft connection disconnected in the usual manner. The tractor portion of the truck may then be moved forwardly, which will automatically disengage the contact members 48 and 58, and also the contact members 56 and 47. When it is desired to attach the tractor or forward portion of the truck to the trailer portion, the driver, by pulling on the handle 41, will lower the arm or bar 29, and he will then back the tractor part into position to make the draft connection, after which he releases the handle 41, and the connectors 46, 47, will be moved upwardly by the spring 35 into contact with the contact members 48 and 56.

While in the present invention the conventional tail light, side lights, and stop lights are shown, it is understood that the connections shown may be also used in conjunction with traffic directional signals. For the sake of clearness these signals have not been illustrated or described. They may have independent circuits similar to the circuits already described.

It is thought from the foregoing, taken in connection with the accompanying drawing, that the construction and operation of my device will be apparent to those skilled in the art and that changes in size, shape, proportion and details may be made without departing from the spirit and scope of the appended claims.

I claim as my invention:

1. In an articulated truck comprising a power section and a trailer section pivotally connected to said power section to swing about a vertical axis, the combination of a plurality of sets of brackets secured to and insulated from said trailer section, an arcuate terminal carried by each set of brackets, at least one of said terminals being spring pressed downwardly, said terminals being on arcs of concentric circles about said pivot as a center, a bracket carried by said power section, an arm pivoted to said last named bracket, electric terminals carried by said arm and contacting said arcuate terminals, respectively, a spring for elevating said arm for bringing the terminals carried thereby into electrical contact with said arcuate terminals, respectively, and means extending forwardly from said arm for lowering said arm.

2. In an articulated truck having a power section provided with a driver's seat, and a trailer section pivoted to said power section to swing about a vertical axis, the combination of a plurality of electric terminals, said terminals having contacting surfaces extending in concentric arcs about said axis as a center, means for supporting said terminals on said trailer section, said terminals being insulated from said trailer section, at least one of said terminals being yieldable vertically, an arm pivotally mounted on said power section to swing in a vertical plane, electric terminals carried by said arm and insulated therefrom, means for yieldably holding said arm elevated with the terminals thereon in electric contact with the corresponding terminals on said trailer section and means including an element extending to a point remote from said terminals for lowering said arm for opening the circuits through said terminals.

3. In an articulated truck having a power section and a trailer section pivoted to said power section to swing about a vertical axis, the combination of a plurality of terminals, said terminals having portions forming segments of circles about said axis as a center, said segments having radii of different lengths, means for supporting said terminals from said trailer section, said terminals being insulated from said trailer section, spring means for biasing one of said terminals downwardly, an arm pivoted on said power section and extending rearwardly therefrom, spring means for elevating said arm, terminals carried by said arm, insulated therefrom and extending different distances rearwardly therefrom for engaging said terminals, respectively, carried by said trailer section and means including a flexible member accessible from the driver's seat on said power section for lowering said arm for opening electric circuits through said terminals.

4. In an articulated truck having a power section and a trailer section pivotally connected together, the combination of a plurality of sets of brackets secured to and insulated from said trailer section, an arcuate terminal carried by each set of brackets, said terminals being segments of concentric circles about the pivot between the sections as a center, a bracket carried by said power section, an arm pivoted to said last named bracket, means for raising and lowering said arm, terminals carried by said arm and insulated therefrom and adapted to contact corresponding terminals carried by said sets of brackets.

5. In an electric connector mechanism for use in an articulated truck having a power section, a trailer section and pivotal connection between said sections, a plurality of sets of brackets for attachment to a trailer section adjacent to said pivotal connection, arcuate terminals carried by said brackets, one of said terminals being spring pressed, a second bracket for attachment to said power section, an arm pivoted to said second bracket, electric terminals carried by said arm for engaging the corresponding ones of said arcuate terminals, spring means for raising said arm for insuring contact of said terminals and means including an elongated element extending to a point remote from said arm for moving said arm and the terminal carried thereby away from said arcuate terminals for disengaging the same.

FREDERICK W. ILSEMAN.